(12) United States Patent
Quaderer

(10) Patent No.: US 10,921,189 B2
(45) Date of Patent: Feb. 16, 2021

(54) DETECTING THE PRESENCE OF PLANTS ON THE GROUND

(71) Applicant: Trimble Inc., Sunnyvale, CA (US)

(72) Inventor: James G. Quaderer, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 245 days.

(21) Appl. No.: 16/110,971

(22) Filed: Aug. 23, 2018

(65) Prior Publication Data

US 2020/0064190 A1 Feb. 27, 2020

(51) Int. Cl.
| | | |
|---|---|---|
| *G01J 3/42* | (2006.01) | |
| *A01M 21/00* | (2006.01) | |
| *A01M 7/00* | (2006.01) | |
| *G01J 1/04* | (2006.01) | |
| *G01J 1/42* | (2006.01) | |
| *G01J 3/50* | (2006.01) | |
| *G01N 21/25* | (2006.01) | |
| *G01J 3/02* | (2006.01) | |
| *G01N 21/84* | (2006.01) | |

(52) U.S. Cl.
CPC .............. *G01J 3/42* (2013.01); *A01M 7/0089* (2013.01); *A01M 21/00* (2013.01); *G01J 1/0437* (2013.01); *G01J 1/4228* (2013.01); *G01J 3/501* (2013.01); *G01N 21/255* (2013.01); *G01J 3/0216* (2013.01); *G01N 2021/8466* (2013.01)

(58) Field of Classification Search
CPC ...... G01J 3/14; G01J 3/42; G01J 3/427; G01J 3/0216; G01J 1/0437; G01J 1/4228; G01J 3/501; G01N 21/255; G01N 2021/8466; A01M 7/0089; A01M 21/00
See application file for complete search history.

(56) References Cited

U.S. PATENT DOCUMENTS

| | | | | |
|---|---|---|---|---|
| 5,296,702 A | * | 3/1994 | Beck | ................... A01M 7/0089 |
| | | | | 250/226 |
| 5,389,781 A | * | 2/1995 | Beck | ................... A01M 7/0089 |
| | | | | 209/582 |
| 5,585,626 A | * | 12/1996 | Beck | ........................ G01J 1/04 |
| | | | | 250/222.1 |
| 5,763,873 A | | 6/1998 | Beck et al. | |
| 5,789,741 A | | 8/1998 | Kinter et al. | |

(Continued)

FOREIGN PATENT DOCUMENTS

| | | |
|---|---|---|
| BR | 9 508 386 A | 11/1997 |
| EP | 0 653 051 A1 | 5/1995 |
| WO | 94/02812 A1 | 2/1994 |

OTHER PUBLICATIONS

Extended European Search Report for Application No. 19193057.7-1006, dated Nov. 4, 2019, 7 pages.

*Primary Examiner* — John R Lee
(74) *Attorney, Agent, or Firm* — Kilpatrick Townsend & Stockton LLP

(57) ABSTRACT

A system for detecting the presence of a plant on the ground includes a light module configured to emit a light beam having a shape with a length longer than a width. The system may include one or more lenses each having one or more photodetectors. The photodetectors may be arranged in a side-by-side configuration and are configured to receive reflected portions of the light beam. The lenses may be configured to direct the reflected portions of the light beam onto the photodetectors.

20 Claims, 10 Drawing Sheets

(56) References Cited

U.S. PATENT DOCUMENTS

| | | | | |
|---|---|---|---|---|
| 5,837,997 | A * | 11/1998 | Beck | G01J 1/04 |
| | | | | 250/227.11 |
| 6,795,568 | B1 * | 9/2004 | Christensen | A01M 21/04 |
| | | | | 250/559.29 |
| 6,855,933 | B2 * | 2/2005 | Stone | G01J 3/427 |
| | | | | 250/341.1 |
| 7,408,145 | B2 * | 8/2008 | Holland | G01J 3/10 |
| | | | | 250/205 |
| 8,755,049 | B2 * | 6/2014 | Holland | G01N 21/553 |
| | | | | 356/445 |
| 9,964,559 | B2 * | 5/2018 | Zielke | G01S 17/46 |
| 10,656,133 | B2 * | 5/2020 | Quaderer | A01M 21/00 |
| 2015/0075066 | A1 * | 3/2015 | Stowe | G06K 9/6267 |
| | | | | 47/1.3 |
| 2015/0075068 | A1 * | 3/2015 | Stowe | A01M 21/04 |
| | | | | 47/1.43 |
| 2020/0064190 | A1 * | 2/2020 | Quaderer | G01J 1/4228 |

\* cited by examiner

DETECTING THE PRESENCE OF PLANTS ON THE GROUND

FIELD OF THE INVENTION

Embodiments described herein relate generally to detecting the presence of plants on the ground, and more particularly, to systems that improve the detection of plants on the ground.

BACKGROUND

The spectral reflectance of plants compared to that of soil can be used to detect the presence of plants on the ground. This is illustrated in FIG. 1, which is an exemplary plot of the reflectance versus wavelength of a living plant 1 compared to that of bare soil 2. Due to the differences between the spectral reflectance characteristics, it is possible to differentiate the living plant 1 from the bare soil 2. For example, light beams of two different wavelengths $W_1$, $W_2$ can be transmitted toward the ground, and the intensities of the different wavelengths of scattered light returning from the ground can be compared to determine if there is a plant 1 or just bare soil 2. This is because light at the different wavelengths is absorbed by the living plant 1 and the bare soil 2 differently. For example, the living plant 1 may mostly absorb red light at wavelengths of between about 650 nm and 700 nm ($W_1$), and the living plant 1 may mostly reflect near infrared light at wavelengths above about 720 nm ($W_2$). In contrast, the bare soil 2 may have a similar reflectance at each of the wavelengths $W_1$, $W_2$.

Detecting a plant in this manner can allow herbicide sprayer systems to reduce the amount of chemicals required to eradicate weeds in a field. For example, a field may be scanned using light beams of two different wavelengths, and each time a weed (or plant) is detected, a valve may be opened to spray herbicide on the weed. A considerable savings may be realized since the herbicide is not sprayed unnecessarily onto the bare soil.

SUMMARY

Embodiments described herein provide improved detection of plants on the ground. In an embodiment, for example, a system includes photodetectors arranged in a side-by-side configuration. When detecting reflected portions of a light beam, gain values applied to amplifiers associated with at least some of the photodetectors can be adjusted to improve a signal-to-noise ratio of the photodetectors. Also, in some embodiments, a field of view of the photodtectors can be controlled by limiting an active number of the photodetectors. Additionally, the photodetectors may be configured to determine an approximate relative position of the plants on the ground. Depending on the embodiment, one or more of these features and/or benefits may exist. Exemplary embodiments are described throughout the specification with reference to the appended drawings.

In accordance with an embodiment, for example, a system for detecting the presence of a plant on the ground includes a light module and a photodetector system. The light module is configured to emit a light beam having a shape with a length longer than a width. The light beam comprises light at a first wavelength and light at a second wavelength different from the first wavelength. The light at the first wavelength is modulated with a first signal having a first phase, and the light at the second wavelength is modulated with a second signal having a second phase different from the first phase. The photodetector system includes photodetectors configured to receive reflected portions of the light beam. The photodetector system includes a first plurality of photodetectors arranged in a side-by-side configuration, and a first lens configured to receive first reflected portions of the light beam and direct the first reflected portions of the light beam onto the first plurality of photodetectors. The first reflected portions of the light beam have the shape with a length longer than a width. The width of the first reflected portions of the light beam impinging on the first plurality of photodetectors is less than a width of any one of the first plurality of photodetectors, and the length of the first reflected portions of the light beam impinging on the first plurality of photodetectors is greater than a length of any one of the first plurality of photodetectors and extends across multiple ones of the first plurality of photodetectors in the side-by-side configuration. The photodetector system also includes a second plurality of photodetectors arranged in the side-by-side configuration, and a second lens configured to receive second reflected portions of the light beam and direct the second reflected portions of the light beam onto the second plurality of photodetectors. The second reflected portions of the light beam have the shape with a length longer than a width. The width of the second reflected portions of the light beam impinging on the second plurality of photodetectors is less than a width of any one of the second plurality of photodetectors, and the length of the second reflected portions of the light beam impinging on the second plurality of photodetectors is greater than a length of any one of the second plurality of photodetectors and extends across multiple ones of the second plurality of photodetectors in the side-by-side configuration.

In an embodiment, the second lens is arranged to shift a location of the second reflected portions of the light beam impinging on the second plurality of photodetectors compared to a location of the first reflected portions of the light beam impinging on the first plurality of photodetectors. The second reflected portions of the light beam impinging on the second plurality of photodetectors may be shifted in a direction of the side-by-side configuration by a distance less than a length of any one of the second plurality of photodetectors.

In one embodiment, the first plurality of photodetectors are configured to function electrically as a single photodiode, and the second plurality of photodetectors are configured to function electrically as a single photodiode. In another embodiment, the first plurality of photodetectors are configured to function electrically as individual photodiodes or as groups of multiple photodiodes, and the second plurality of photodetectors are configured to function electrically as individual photodiodes or as groups of multiple photodiodes.

In one embodiment, the photodetector system also includes a mask shaped to prevent end parts of the first reflected portions of the light beam in the length direction from impinging on at least some of the first plurality of photodetectors depending on a location where the first reflected portions of the light beam impinges on the first plurality of photodetectors in the width direction. In another embodiment, the mask is shaped to limit a field of view of the first plurality of photodetectors depending on a location where the first reflected portions of the light beam impinge on the first plurality of photodetectors in the width direction.

In another embodiment, the photodetector system is configured to limit a field of view of the first plurality of photodetectors by limiting a number of active ones of the first plurality of photodetectors.

In another embodiment, the photodetector system is configured to increase a gain value applied to amplifiers of outer ones of the first plurality of photodetectors in the side-by-side configuration compared to a gain value applied to amplifiers of inner ones of the first plurality of photodetectors in the side-by-side configuration.

In another embodiment, the photodetector system is configured to generate a signal and provide the signal to a controller depending on a sequence of electrical signals generated by the first plurality of photodetectors.

In yet another embodiment, the photodetector system is configured to determine an approximate position of the plant on the ground and to provide a signal to a controller depending on the approximate position of the plant on the ground.

In accordance with another embodiment, a system for detecting the presence of a plant on the ground includes a light module that is configured to emit a light beam having a shape with a length longer than a width. The light beam comprising light at a first wavelength and light at a second wavelength different from the first wavelength. The system also includes a plurality of photodetectors arranged in a side-by-side configuration and configured to receive reflected portions of the light beam, and a lens configured to receive reflected portions of the light beam and direct the reflected portions of the light beam onto the plurality of photodetectors. The reflected portions of the light beam have the shape with a length longer than a width. The width of the reflected portions of the light beam impinging on the plurality of photodetectors is less than a width of any one of the plurality of photodetectors, and the length of the reflected portions of the light beam impinging on the plurality of photodetectors is greater than a length of any one of the plurality of photodetectors and extends across multiple ones of the plurality of photodetectors in the side-by-side configuration.

In one embodiment, the plurality of photodetectors are configured to function electrically as a single photodiode. In another embodiment, the plurality of photodetectors are configured to function electrically as individual photodiodes or as groups of multiple photodiodes.

In another embodiment, the system also includes a mask shaped to limit a field of view of the plurality of photodetectors depending on a location where the reflected portions of the light beam impinge on the plurality of photodetectors in the width direction.

In yet another embodiment, the system also includes a controller configured to increase a gain value applied to amplifiers of outer ones of the plurality of photodetectors in the side-by-side configuration compared to a gain value applied to amplifiers of inner ones of the plurality of photodetectors in the side-by-side configuration.

In accordance with yet another embodiment, a system for detecting the presence of a plant on the ground includes a light module configured to emit a light beam having a shape with a length longer than a width. The light beam comprises light at a first wavelength and light at a second wavelength different from the first wavelength. The system also includes a first photodetector and a first lens configured to receive first reflected portions of the light beam and direct the first reflected portions of the light beam onto the first photodetector. The first reflected portions of the light beam have the shape with a length longer than a width. The system also includes a second photodetector and a second lens configured to receive second reflected portions of the light beam and direct the second reflected portions of the light beam onto the second photodetector. The second reflected portions of the light beam have the shape with a length longer than a width.

In an embodiment, the second lens is arranged to shift a location of the second reflected portions of the light beam impinging on the second photodetector compared to a location of the first reflected portions of the light beam impinging on the first photodetector.

In another embodiment, the first photodetector comprises a first plurality of photodetectors arranged in a side-by-side configuration, and the second photodetector comprises a second plurality of photodetectors arranged in a side-by-side configuration.

In yet another embodiment, the first photodetector is configured to generate a signal and provide the signal to a controller depending on a sequence of electrical signals generated by the first photodetector.

DETAILED DESCRIPTION

Embodiments described herein provide improved detection of plants on the ground. Some embodiments may include one or more lenses each associated with one or more photodetectors. The photodetectors may be arranged in a side-by-side configuration and are configured to receive reflected portions of a light beam. The lenses may be configured to direct the reflected portions of the light beam onto the photodetectors.

Figure 1:
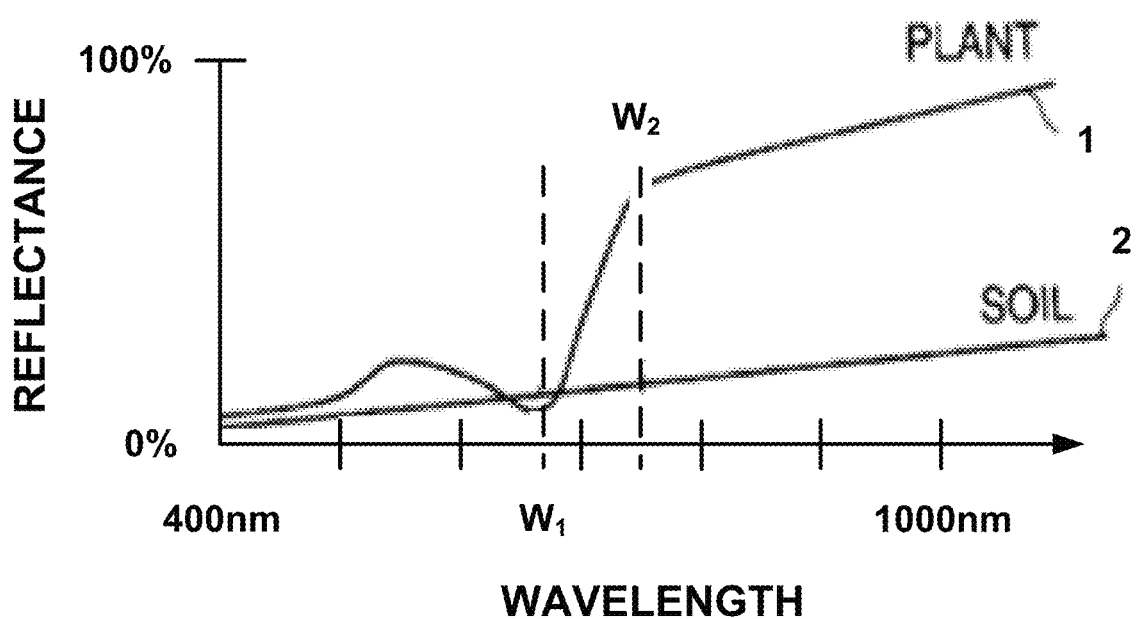
FIG. 1 is a plot illustrating the spectral reflectance of a plant compared to that of soil.
Figure 2:
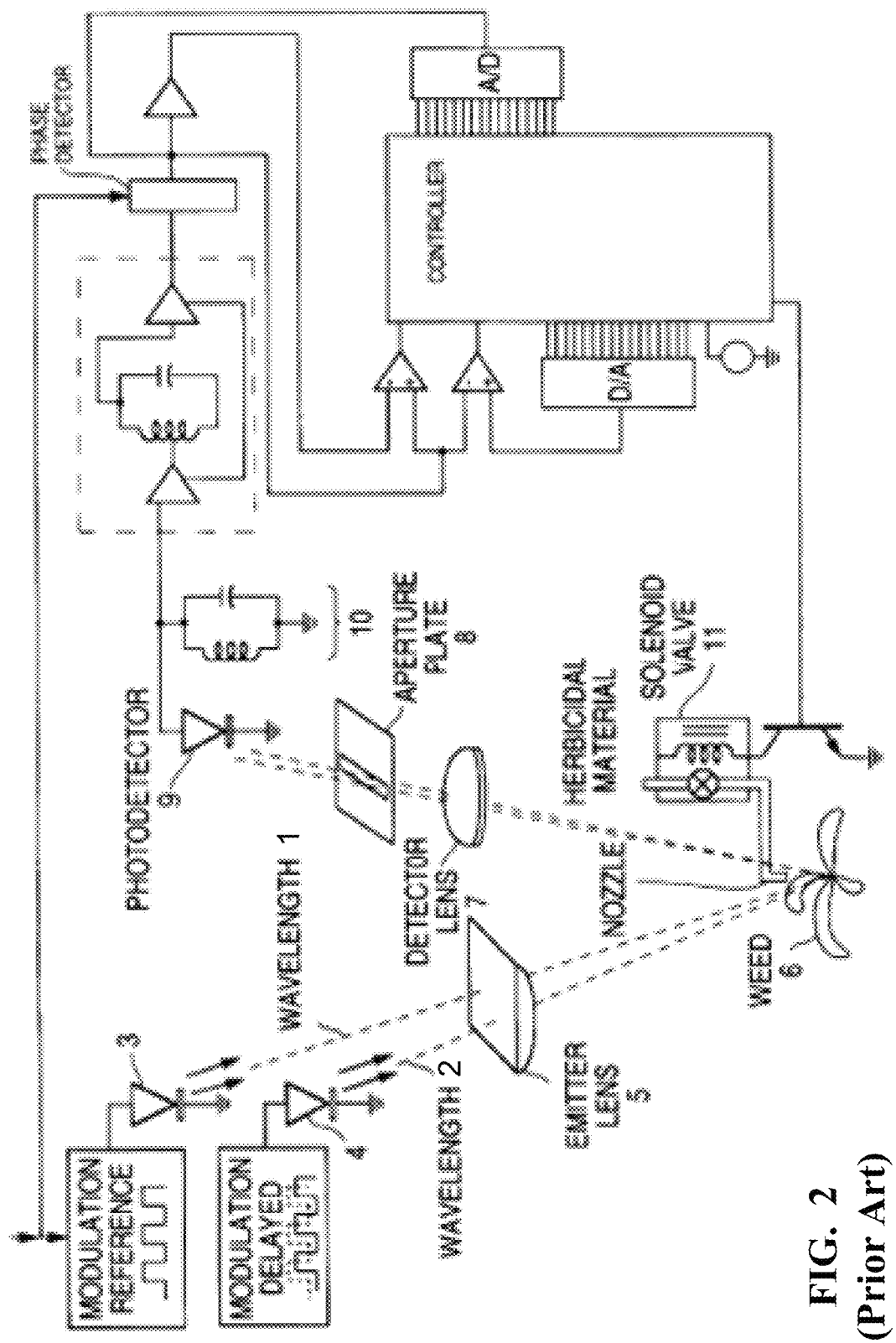
FIG. 2 is a simplified schematic diagram of an exemplary herbicide sprayer system.

FIG. 2 is a simplified schematic diagram of an exemplary herbicide sprayer system that may benefit from the embodiments described herein. The herbicide sprayer system is used merely as an example, and it should be appreciated that the embodiments described herein may be used with other types of plant detection systems.

In the herbicide sprayer system shown in FIG. 2, a first diode 3 emits light at a first wavelength and a second diode 4 emits light at a second wavelength. In this example, the drive currents of the diodes 3, 4 are each modulated with respective modulation signals that are of the same frequency but different phase. The light from the diodes 3, 4 passes through an emitter lens 5 and is directed toward an object on the ground (in this case a plant 6). Some of the light impinging on the plant 6 is reflected and passes through a detector lens 7 and an aperture plate 8 before impinging on a photodetector 9. A resonant circuit 10 is tuned to the frequency of the modulation signals.

The phase of the scattered light impinging upon the photodetector 9 is used to assess the spectral reflectance characteristic of the scattered light and therefore to characterize the object (e.g., the plant 6 on the ground) from which the light is scattered. For example, if the light from the diode 4 were completely absorbed by the plant 6, then the only light received by the photodetector 9 would be from the diode 3. The photodetector 9 would therefore be modulated with a signal approximately in phase with the modulation signal driving the diode 3.

If, on the other hand, no light from the diode 3 were scattered from the plant 6, then the only light received by the photodetector 9 would be from the diode 4. Consequently, the oscillation induced in resonant circuit 10 would have a second phase relationship with respect to the phase of the modulation signal used to drive the diode 3.

The foregoing example represent extreme cases. In practice, the photodetector 9 typically receives some light from each of the diodes 3, 4. Then, depending on the relative reflectance values, the phase of the resonant circuit 10 is between the first and second extreme phase relationships described above.

A phase detector detects the phase of the oscillation induced in resonant circuit 10, providing phase information indicative of the relative strengths of the scattered light beams from the diodes 3, 4. If this phase information is consistent with the spectral reflectance characteristic of a plant 6, then a solenoid valve 11 is opened to spray herbicide onto the plant 6. Conversely, if the phase information is consistent with the spectral reflectance characteristic of soil, the solenoid valve 11 remains closed.

It should be appreciated that the schematic diagram shown in FIG. 2 depicts an exemplary herbicide sprayer system. The embodiments described herein are not limited to this system, and they may be implemented in other systems that may include different and/or additional components. As examples, some systems may utilize time-division multiplexing of the light at the different wavelengths, or other systems may separate the light into different channels using optical filters, rather than using the phase shift technique described with regard to FIG. 2. Also, some systems may utilize light at more than two different wavelengths.

Figure 3:
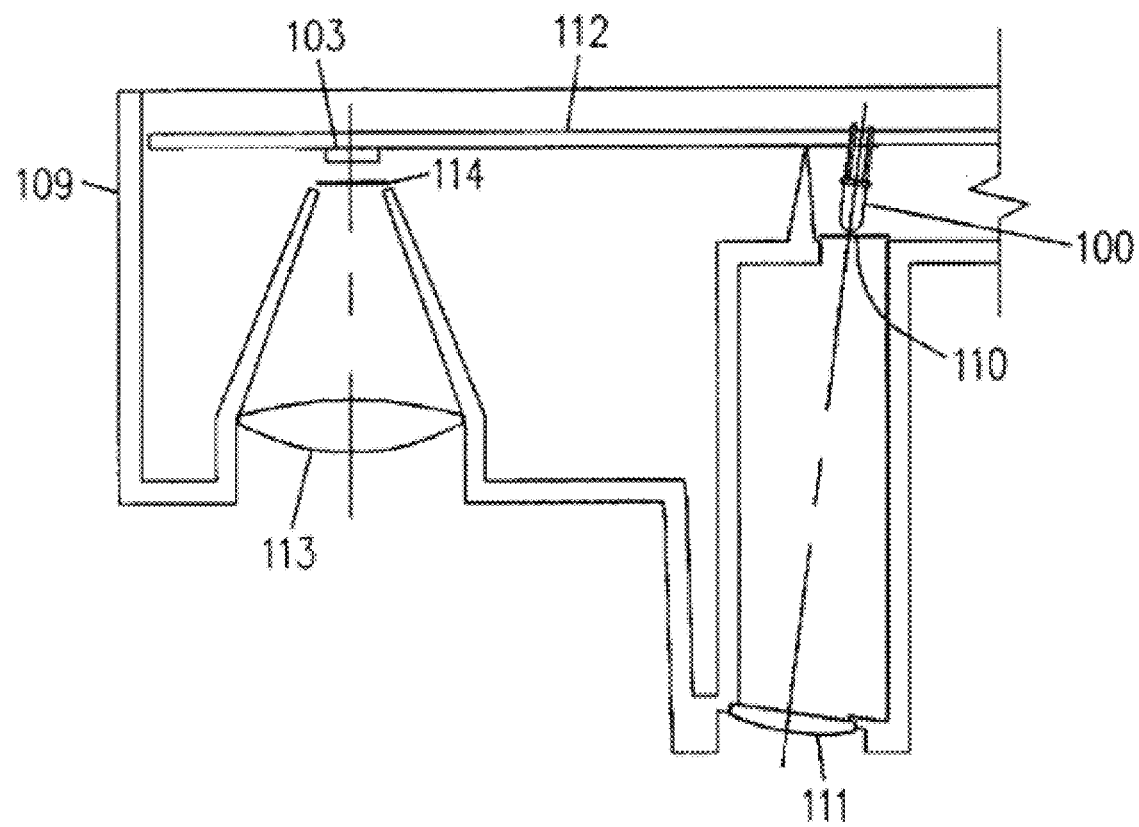
FIG. 3 is a simplified cross-sectional view of a portion of an exemplary herbicide sprayer system.

FIG. 3 is a simplified cross-sectional view of a portion of an exemplary herbicide sprayer system. The portion shown in this figure includes some components for detecting the presence of plants on the ground such as a housing 109, diodes 100 (e.g., light emitting diodes), an emitter mask 110, an emitter lens 111, a detector lens 113, a detector mask 114, a photodetector 103, and a printed circuit board 112. The emitter mask 110 and/or detector mask 114 may be optional in some embodiments. The diodes 100 may be configured to emit light at different wavelengths as discussed previously (e.g., $W_1$, $W_2$). Portions of the emitted light are reflected by plants and/or bare soil. Reflected portions of the light are received at the photodetector 103, and signals from the photodetector 103 may be used to detect the presence of the plants on the ground.

FIG. 3 does not specifically show all the circuitry and/or hardware components for performing functions such as generating the light, detecting the light, analyzing the spectral reflectance characteristics, and controlling valves associated with the sprayer system.

In actual implementations, a plurality of the herbicide sprayer systems may be arranged adjacent to each other on an implement that is coupled to a tractor or another type of farm equipment. A height of the herbicide sprayer systems above the ground may be adjusted to provide nearly full coverage of the ground under the implement. In some arrangements, the light beams emitted from the herbicide sprayer systems have little to no overlap on the ground to avoid detection and double spraying of plants by adjacent systems.

Figure 4A:
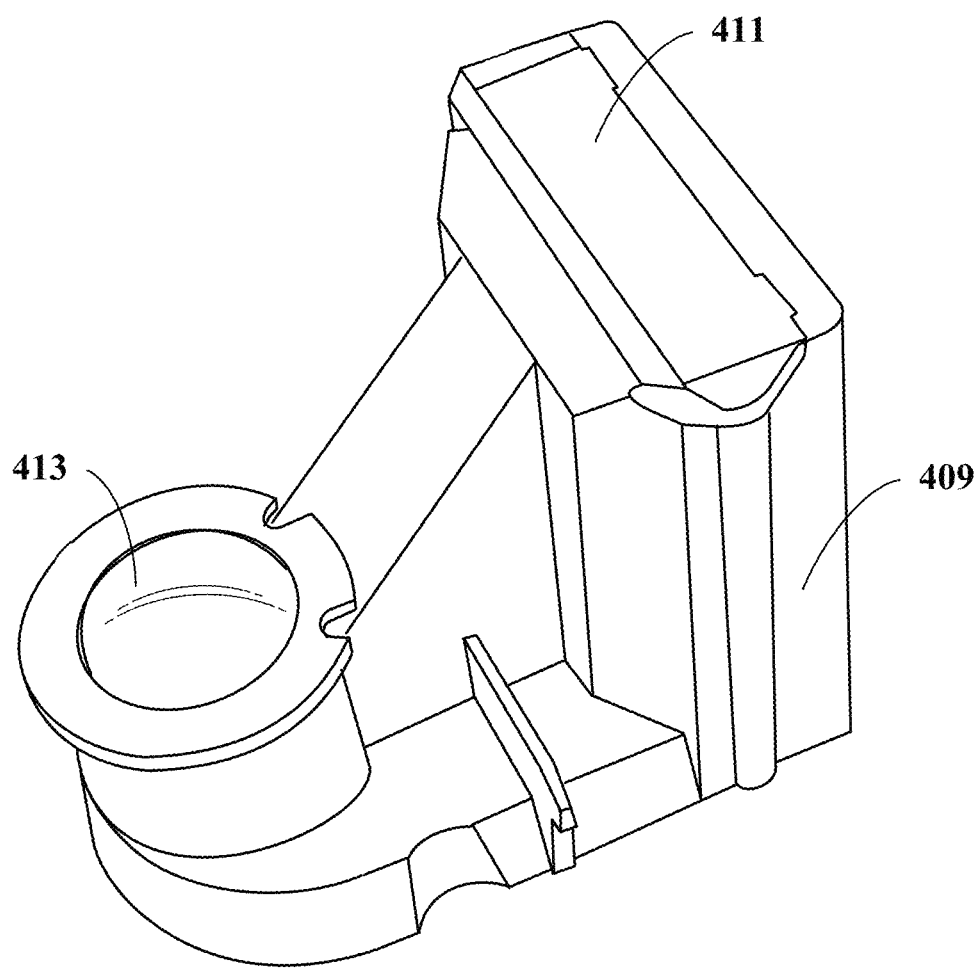
FIGS. 4A-4B and 5A-5C are simplified drawings of portions of systems for detecting the presence of plants on the ground in accordance with some embodiments.
Figure 4B:
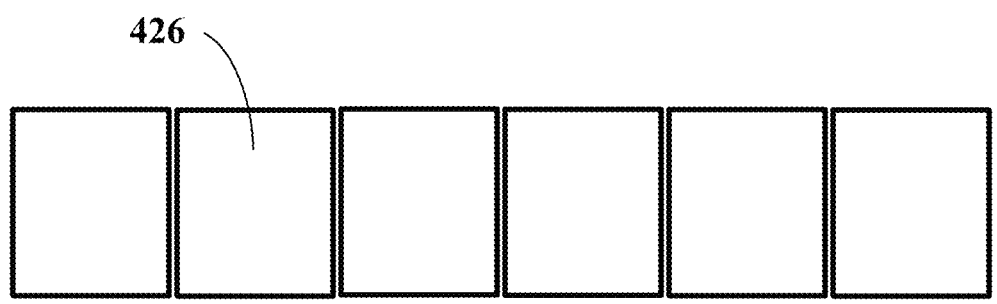

FIGS. 4A-4B are simplified drawings of a portion of a system for detecting the presence of plants on the ground in accordance with an embodiment. The portion shown in FIG. 4A may be part of a larger herbicide sprayer system. This figure provides a perspective view of a housing 409, an emitter lens 411, and a detector lens 413. The emitter lens 411 and/or the detector lens 413 may alternatively be protective covers that protect underlying lenses and are at least partially transparent to light emitted and received by the system.

Diodes within the housing 409 may be configured to emit light at different wavelengths. The diodes and emitter lens 411 may be part of a light module that is configured to emit a light beam. The light beam is directed toward the ground, and reflected portions of the light beam may be received by the detector lens 413 and directed towards a plurality of photodetectors. The detector lens 413 and photodetectors may be part of a photodetector system that is configured to receive reflected portions of the light beam.

FIG. 4B provides an example of photodetectors 426 arranged in a side-by-side configuration. Each photodetector may have a rectangular shape so that sides abut one or more adjacent photodetectors. Each photodetector is typically on the order of a few millimeters per side in length. The side-by-side configuration of the photodetectors 426 may extend approximately parallel to a length of the reflected portions of the light beam. The side-by-side configuration may extend along any axis depending on the configuration of the light module and any optical members altering an orientation of the light beam.

The photodetectors 426 may be disposed within the housing 409 and arranged to receive reflected portions of the light beam from the detector lens 413. In some embodiments, the photodetectors 426 are configured to function electrically as a single photodiode. For example, the photodetectors 426 may be electrically coupled in parallel and configured to generate a single electrical signal.

In other embodiments, the photodetectors 426 may be configured to function electrically as individual photodiodes or as groups of multiple photodiodes. For example, the photodetectors 426 and associated circuitry may be configured so that each photodetector generates a separate electrical signal. Alternatively, the photodetectors 426 and associated circuitry may be configured so that groups of the photodetectors 426 generate a single electrical signal (e.g., groups of two photodetectors, groups of three photodetectors, etc.).

Figure 5A:
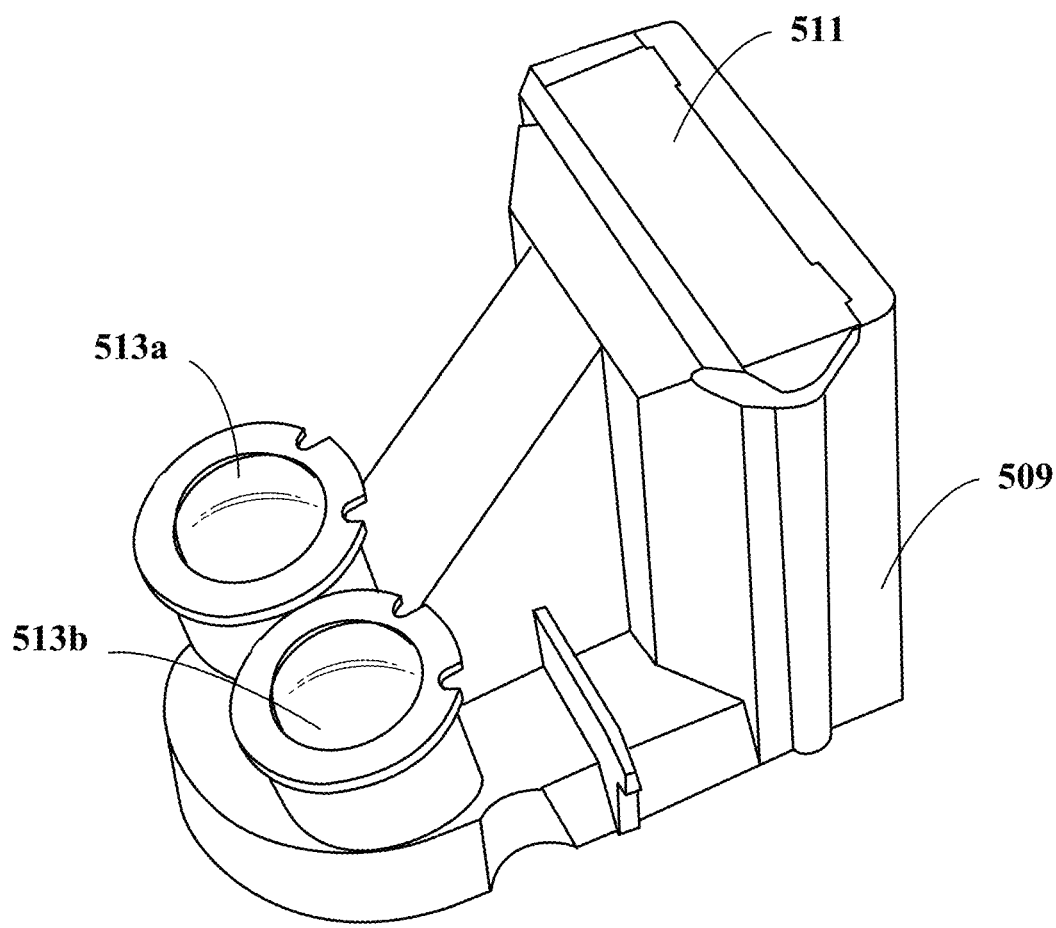
Figure 5B:
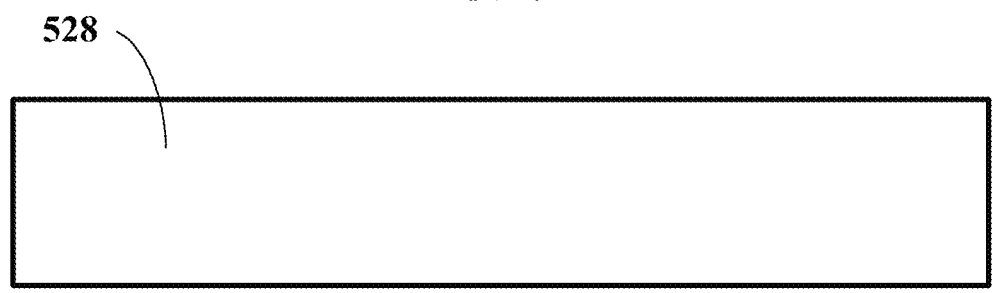
Figure 5C:
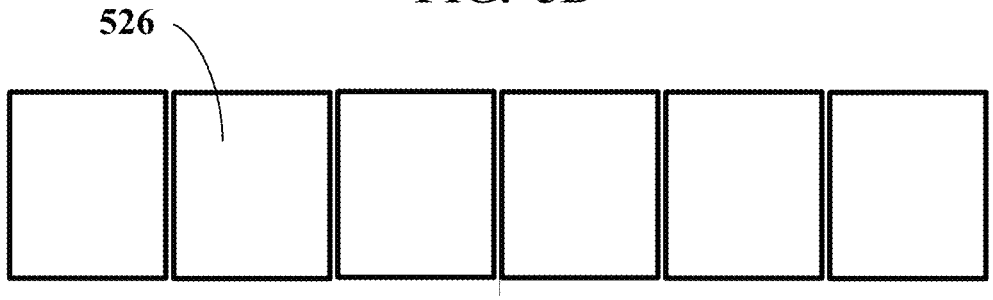

FIGS. 5A-5C are simplified drawings of a portion of a system for detecting the presence of plants on the ground in accordance with another embodiment. The portion shown in FIG. 5A may be part of a larger herbicide sprayer system. This figure provides a perspective view of a housing 509, an emitter lens 511, and detector lenses 513a, 513b. The housing 509 and emitter lens 511 are similar to their corresponding features in FIG. 4A and will not be described separately. This embodiment is different from FIG. 4A in that it includes two detector lenses 513a, 513b. Reflected portions of the light beam are directed by the first detector lens 513a to one or more first photodetectors and by the second detector lens 513b to one or more second photodetectors.

FIG. 5B provides an example of a single photodetector 528 that may be used in some embodiments. Two such photodetectors 528 may be disposed within the housing 509, and each photodetector 528 may be arranged to receive reflected portions of the light beam from an associated one of the detector lenses 513a, 513b. The detector lenses 513a, 513b may be arranged to receive non-overlapping or overlapping portions of the reflected light beam. Using multiple lenses 513a, 513b and photodetectors 528 can increase an effective field of view of the system. Alternatively, using multiple lenses 513a, 513b and photodetectors 528 can provide multiple images of the same reflected portions of the light beam.

FIG. 5C provides an example of a plurality of photodetectors 526 arranged in a side-by-side configuration that may be used in some embodiments. The photodetectors 526 are similar to the photodetectors 426 shown in FIG. 4B and can be configured to function in a similar manner. Similar features will not be described separately. A first one of the plurality of photodetectors 526 may be disposed within the housing 509 and arranged to receive reflected portions of the light beam from the first detector lens 513a, and a second one of the plurality of photodetectors 526 may be disposed within the housing 509 and arranged to receive reflected portions of the light beam from the second detector lens 513b.

Figure 6A:
FIGS. 6A-6B are simplified drawings illustrating the scanning of a plant on the ground in accordance with an embodiment.
Figure 6B:
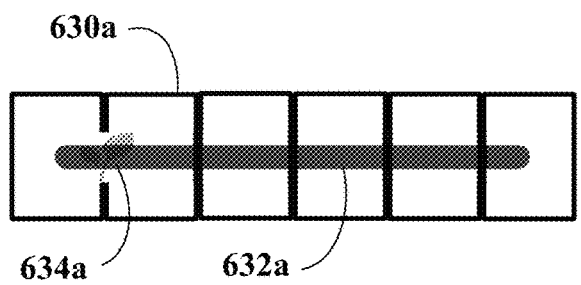
Figure 6B:
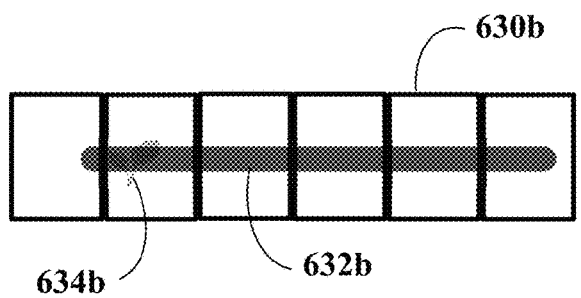

FIGS. 6A-6B are simplified drawings illustrating the scanning of a plant on the ground in accordance with an embodiment. This example assumes a system similar to that shown in FIG. 5A with a plurality of photodetectors similar to those shown in FIG. 5C. FIG. 6A shows a light beam 632 having a shape with a length longer than a width. The narrow width allows the light beam 632 to be scanned across the ground, or as shown in FIG. 6A, to be scanned across a plant 634 on the ground, while providing an increased signal-to-noise ratio (SNR) compared to beams of a larger width.

Although not specifically shown, the light beam 632 may be generated by one or more diodes and focused by an emitter lens. As explained previously, the light beam 632 may include light at a first wavelength and light at a second wavelength different from the first wavelength. Because the plant 634 has different spectral reflectance characteristics than the surrounding bare soil, portions of the light beam 632 impinging on the plant 634 will reflect differently than portions of the light beam 632 impinging on the bare soil.

Reflected portions of the light beam are received by one or more lenses and directed to one or more photodetectors. In this example, first reflected portions of the light beam 632a are directed to first photodetectors 630a as shown on the left side of FIG. 6B, and second reflected portions of the light beam 632b are directed to second photodetectors 630b as shown on the right side of FIG. 6B. Although not specifically shown, the first reflected portions of the light beam 632a and the second reflected portions of the light beam 632b are each directed onto the photodetectors 630a, 630b respectively by associated first and second lenses (similar to lenses 513a, 513b shown in FIG. 5A).

As shown in FIG. 6B, the first and second reflected portions of the light beam 632a, 632b each have the shape with a length longer than a width (similar to the shape of the emitted light beam). Widths of the first and second reflected portions of the light beam 632a, 632b impinging on the photodetectors 630a, 630b respectively are each less than a width of any one of the photodetectors 630a, 630b. Lengths of the first and second reflected portions of the light beam 632a, 632b impinging on the photodetectors 630a, 630b respectively are each greater than a length of any one of the photodetectors and extend across multiple ones of the photodetectors in the side-by-side configuration.

In this example, the first and second reflected portions of the light beam 632a, 632b include reflected light from the entire length of the light beam 632 (a field of view of the first and second lenses each encompass the entire light beam). However, a location of the second reflected portions of the light beam 632b on the photodetectors 630b is shifted compared to a location of the first reflected portions of the light beam 632a on the photodetectors 630a. This can be seen in FIG. 6B, where the first reflected portions of the light beam 632a are approximately centered on the first photodetectors 630a, and the second reflected portions of the light beam 632b are shifted to the right on the second photodetectors 630b. The second reflected portions of the light beam 632b are shifted in a direction of the side-by-side configuration (in the length direction) by a distance less than a length of any one of the photodetectors.

The second reflected portions of the light beam 632b are shifted to eliminate any "blind spots" in the collective field of view of the first and second photodetectors. A "blind spot" is illustrated on the left side of FIG. 6B, where a part of the first reflected portions of the light beam 632a that is impacted by the plant 634a falls on a boundary between two of the photodetectors 630a. The plant 634a is included in the figure to represent the part of the first reflected portions of the light beam 632a where an intensity of the reflected light will be reduced because of the presence of the plant 634 on the ground. Because the part of the first reflected portions of the light beam 632a that is impacted by the plant 634a falls on the boundary between two of the photodetectors 630a, it is possible that the signal will not be sufficient to detect the plant thus causing a "blind spot."

A location of the second reflected portions of the light beam 632b on the photodetectors 630b is shifted so that any "blind spots" on the photodetectors 630a are not "blind spots" on the photodetectors 630b (and vice versa). This is shown in FIG. 6B, where a part of the second reflected portions of the light beam 632b that is impacted by the plant 634b falls completely on one of the photodetectors 630b. Because the part in not on a "blind spot," the signal will be greater and it should be sufficient to detect the plant.

The example shown in FIGS. 6A-6B also illustrates how the photodetectors 630a, 630b can be used to determine an approximate position of the plant 634 on the ground relative to the light beam 632. Using the photodetectors 630b as an example, each individual photodetector receives reflected light from a particular part of the light beam 632. Detection of a plant by one of the photodetectors is an indication that there is a plant within the corresponding part of the light beam 632 on the ground. A signal can be sent to a controller indicating the approximate position of the plant on the ground. The controller may use this information, for example, to open a particular valve of the sprayer system that is most closely aligned with the position of the plant.

Figure 7A:
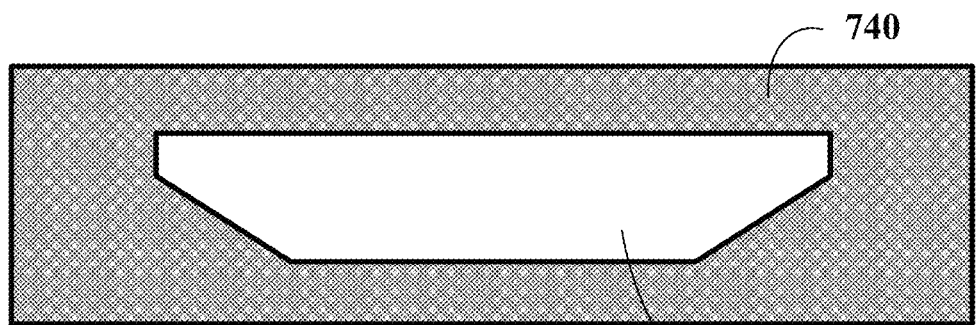
FIGS. 7A-7C are simplified drawings of a mask used to limit a field of view of a group of photodetectors in accordance with an embodiment.
Figure 7B:
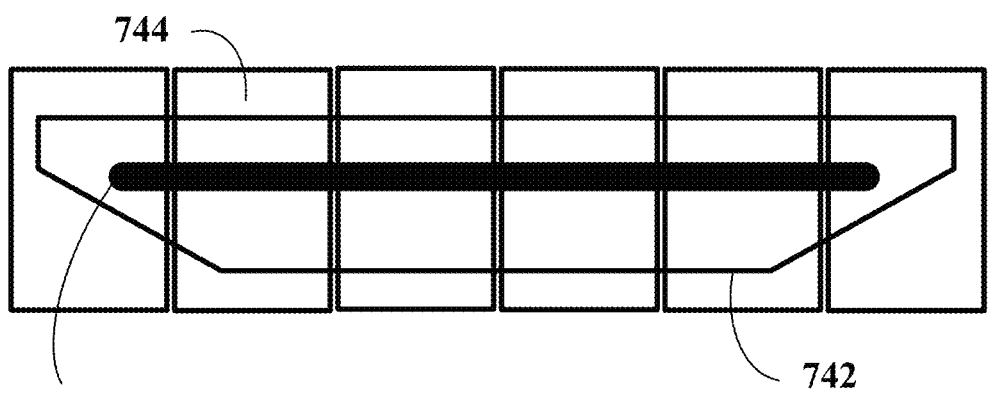
Figure 7C:
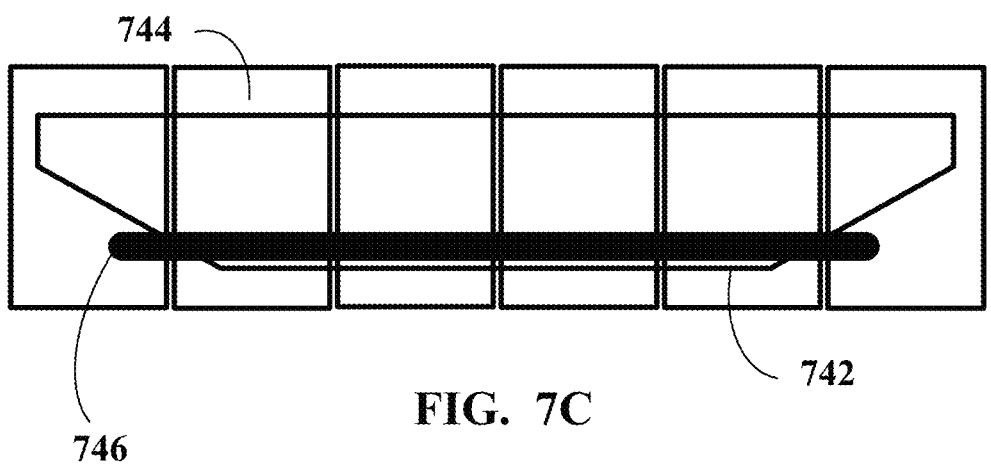

FIGS. 7A-7C are simplified drawings of a mask shaped to limit a field of view of a group of photodetectors in accordance with an embodiment. FIG. 7A shows a mask 740 having an aperture 742. In FIG. 7B-7C, an outline of the aperture 742 is superimposed on photodetectors 744. Reflected portions of a light beam 746 passing through the aperture 742 impinge on the photodetectors 744. Reflected portions of the light beam 746 that are outside the aperture 742 are blocked by the mask 740.

As a height of the system above the ground is changed, a location where the reflected portions of the light beam 746 impinge on the photodetectors 744 changes in a width direction (height of the photodetectors 744 in FIGS. 7B-7C). This is because the emitted light beam and/or the reflected portions of the light beam are at a slight angle as shown in FIG. 3.

In some embodiments, the aperture is arranged to block end parts of the reflected portions of the light beam 746 from impinging on some of the photodetectors 744. The extent of the blocking depends on the location where the reflected portions of the light beam 746 impinge on the photodetectors 744 in the width direction.

This is shown in FIG. 7C, where end parts of the reflected portions of the light beam 746 are outside the aperture 742 and thus blocked from reaching outer ones of the photodetectors 744. This may be useful, for example, when a height of the system above the ground is increased causing a length of the light beam impinging on the ground to increase (an increase in a field of view).

Blocking some of the photodetectors 744 can limit a field of view to prevent overlap between adjacent systems in implementations where multiple systems are arranged, for example, on an implement coupled to a tractor or another type of farm equipment.

Figure 8:
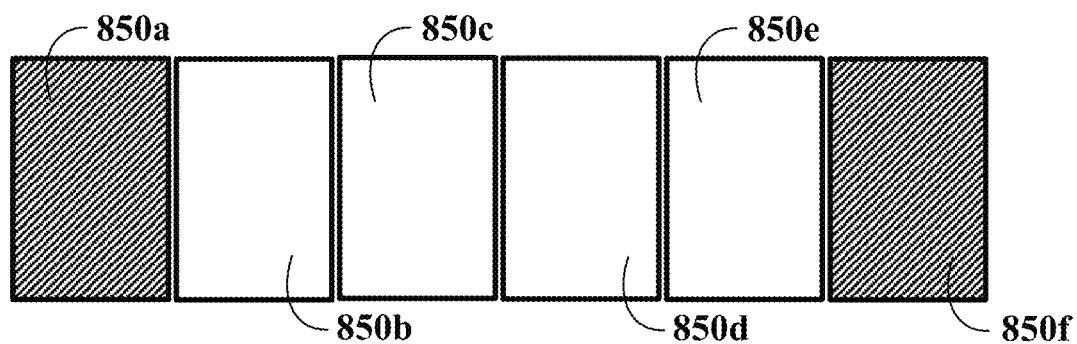
FIGS. 8-9 are simplified drawings of photodetectors arranged in side-by-side configurations in accordance with some embodiments.
Figure 9:
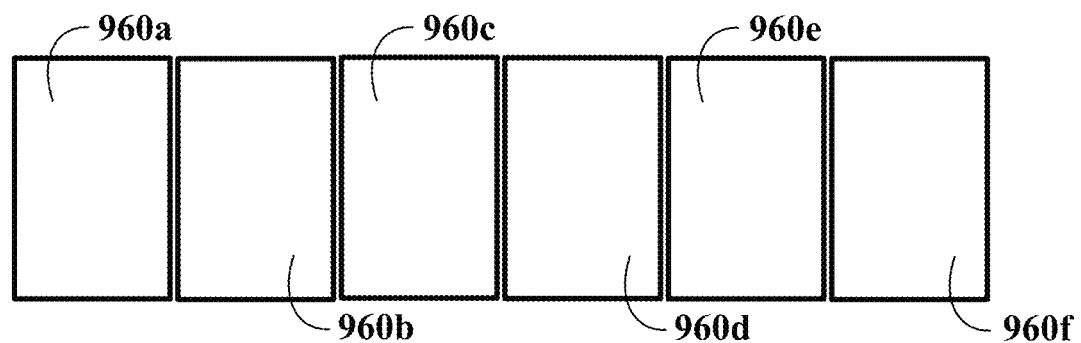

FIGS. 8-9 are simplified drawings of photodetectors arranged in side-by-side configurations in accordance with some embodiments. FIG. 8 shows photodetectors 850a-850f arranged in a side-by-side configuration. In this example, a field of view of the photodetectors 850a-850f is limited by turning off or disregarding signals from the outer photodetectors 850a and 850f. The remaining photodetectors 850b, 850c, 850d, 850e remain active. Other ones of the photodetectors 850a-850f may be limited in other embodiments.

FIG. 9 shows photodetectors 960a-960f arranged in a side-by-side configuration. In this example, a gain value applied to amplifiers of outer ones of the photodetectors (e.g., 960a and 960f) may be increased compared to gain values applied to amplifiers of inner ones of the first plurality of photodetectors (e.g., 960b, 960c, 960d, 960e). Increasing the gain can improve a signal-to-noise (SNR) ratio because an intensity of reflected portions of a light beam generally decreases with distance from a center of the light beam. A gain value applied to amplifiers of other ones of the photodetectors 960a-960f may also be increased or decreased depending on particular conditions and applications.

Figure 10:
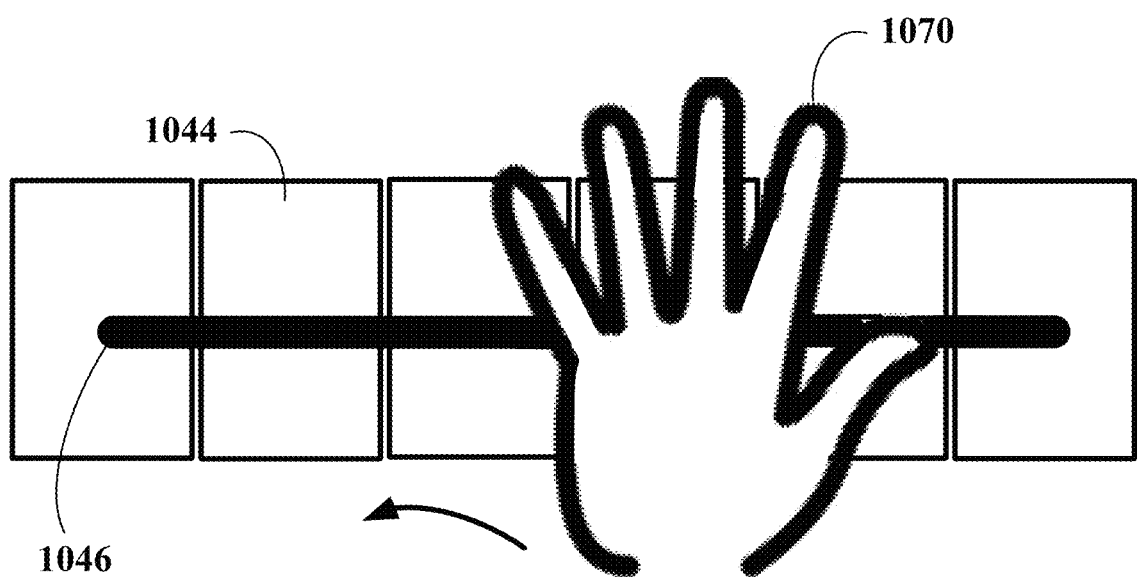
FIG. 10 is a simplified drawing illustrating a hand gesture used to generate signals for a controller in accordance with an embodiment.

FIG. 10 is a simplified drawing illustrating a hand gesture used to generate signals for a controller in accordance with an embodiment. A sequence of electrical signals generated by photodetectors 1044 can be used to generate a signal for manual control of a herbicide sprayer system. For example, moving a user's hand (or anything that blocks the light beam) from right to left creates a sequence of signals that can be used by a controller to take some pre-determined action (e.g., opening or closing a valve of the herbicide sprayer system). This can be useful, for example, when the user is working on the herbicide sprayer system.

Figure 11:
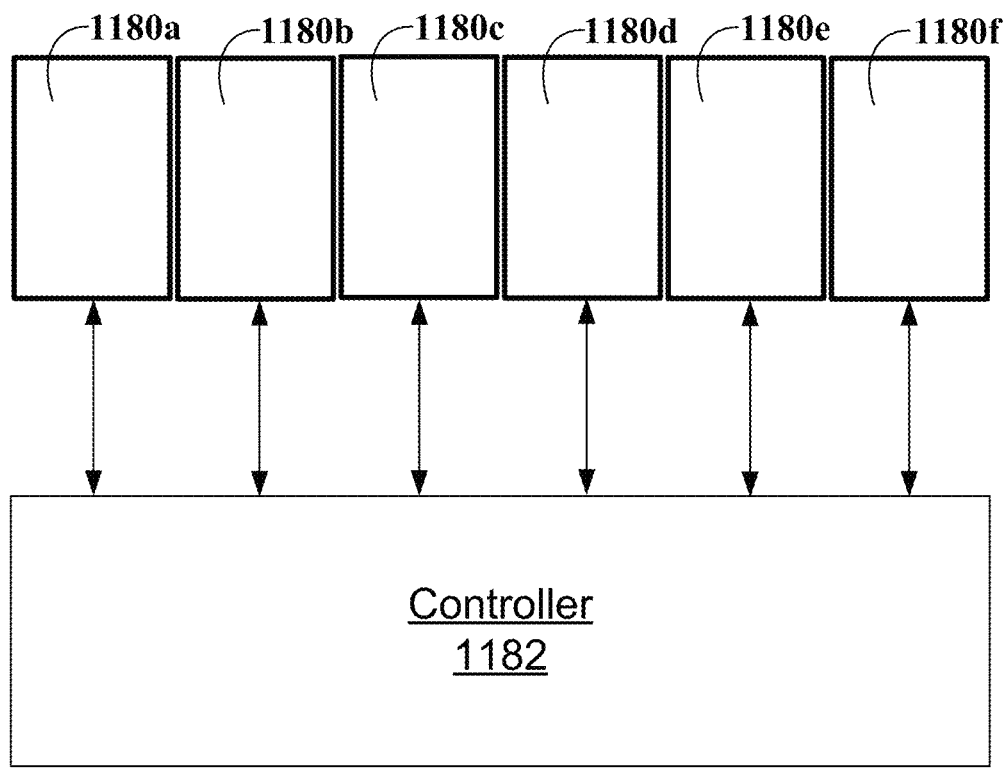
FIG. 11 is a simplified drawing of photodetectors providing signals to a controller in accordance with an embodiment.

FIG. 11 is a simplified drawing of photodetectors providing signals to a controller in accordance with an embodiment. In this example, photodetectors 1180a-1180f are each configured to provide a signal to controller 1182. Different gestures, as explained with regard to FIG. 10, can be associated with different actions by the controller.

The controller 1182 typically includes familiar software and hardware components. For example, it may include one or more operating systems, processors, local or remote memories for storage, I/O devices, and system buses interconnecting the hardware components. RAM and disk drives are examples of memories for storage of data and computer programs. Other types of local memories include magnetic storage media, optical storage media, flash memory, networked storage devices, and the like.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A system for detecting the presence of a plant on the ground, comprising:
    a light module configured to emit a light beam having a shape with a length longer than a width, the light beam comprising light at a first wavelength and light at a second wavelength different from the first wavelength, the light at the first wavelength modulated with a first signal having a first phase, and the light at the second wavelength modulated with a second signal having a second phase different from the first phase;
    a photodetector system comprising photodetectors configured to receive portions of the light beam reflected from surfaces that include surfaces on the plant and surfaces on the ground, the photodetector system comprising:
        a first plurality of photodetectors arranged in a side-by-side configuration;
        a first lens configured to receive first reflected portions of the light beam and direct the first reflected portions of the light beam onto the first plurality of photodetectors to provide a first field of view of the surfaces on the first plurality of photodetectors, the first reflected portions of the light beam having the shape with a length longer than a width, wherein the width of the first reflected portions of the light beam impinging on the first plurality of photodetectors is less than a width of any one of the first plurality of photodetectors, and the length of the first reflected portions of the light beam impinging on the first plurality of photodetectors is greater than a length of any one of the first plurality of photodetectors and extends across multiple ones of the first plurality of photodetectors in the side-by-side configuration;
        a second plurality of photodetectors separate from the first plurality of photodetectors, the second plurality of photodetectors arranged in the side-by-side configuration; and
        a second lens separate from the first lens, the second lens configured to receive second reflected portions of the light beam and direct the second reflected portions of the light beam onto the second plurality of photodetectors to provide a second field of view of the surfaces on the second plurality of photodetectors, the second reflected portions of the light beam having the shape with a length longer than a width, wherein the width of the second reflected portions of the light beam impinging on the second plurality of photodetectors is less than a width of any one of the second plurality of photodetectors, and the length of the second reflected portions of the light beam impinging on the second plurality of photodetectors is greater than a length of any one of the second plurality of photodetectors and extends across multiple ones of the second plurality of photodetectors in the side-by-side configuration, wherein the first field of view of the surfaces on the first plurality of photodetectors and the second field of view of the surfaces on the second plurality of photodetectors both encompass reflected portions from an entirety of the length of the light beam.

2. The system of claim 1 wherein the second lens is arranged to shift a location of the second reflected portions of the light beam impinging on the second plurality of photodetectors compared to a location of the first reflected portions of the light beam impinging on the first plurality of photodetectors.

3. The system of claim 1 wherein the second lens is arranged to shift a location of the second reflected portions of the light beam impinging on the second plurality of photodetectors compared to a location of the first reflected portions of the light beam impinging on the first plurality of photodetectors, wherein the second reflected portions of the light beam impinging on the second plurality of photodetectors are shifted in a direction of the side-by-side configuration by a distance less than a length of any one of the second plurality of photodetectors.

4. The system of claim 1 wherein the first plurality of photodetectors are configured to function electrically as a single photodiode, and the second plurality of photodetectors are configured to function electrically as a single photodiode.

5. The system of claim 1 wherein the first plurality of photodetectors are configured to function electrically as individual photodiodes or as groups of multiple photodiodes, and the second plurality of photodetectors are configured to function electrically as individual photodiodes or as groups of multiple photodiodes.

6. The system of claim 1 wherein the photodetector system further comprises a mask shaped to prevent end parts of the first reflected portions of the light beam in the length direction from impinging on at least some of the first plurality of photodetectors depending on a location where the first reflected portions of the light beam impinge on the first plurality of photodetectors in the width direction.

7. The system of claim 1 wherein the photodetector system further comprises a mask shaped to limit a field of view of the first plurality of photodetectors depending on a location where the first reflected portions of the light beam impinge on the first plurality of photodetectors in the width direction.

8. The system of claim 1 wherein the photodetector system is configured to limit a field of view of the first plurality of photodetectors by limiting a number of active ones of the first plurality of photodetectors.

9. The system of claim 1 wherein the photodetector system is configured to increase a gain value applied to amplifiers of outer ones of the first plurality of photodetectors in the side-by-side configuration compared to a gain value applied to amplifiers of inner ones of the first plurality of photodetectors in the side-by-side configuration.

10. The system of claim 1 wherein the photodetector system is configured to generate a signal and provide the signal to a controller depending on a sequence of electrical signals generated by the first plurality of photodetectors.

11. The system of claim 1 wherein the photodetector system is configured to determine an approximate position of the plant on the ground and to provide a signal to a controller depending on the approximate position of the plant on the ground.

12. A system for detecting the presence of a plant on the ground, comprising:
a light module configured to emit a light beam having a shape with a length longer than a width, the light beam comprising light at a first wavelength and light at a second wavelength different from the first wavelength;
a first plurality of photodetectors arranged in a side-by-side configuration and configured to receive first portions of the light beam reflected from surfaces that include surfaces on the plant and surfaces on the ground;
a first lens configured to receive first reflected portions of the light beam and direct the first reflected portions of the light beam onto the first plurality of photodetectors, the first reflected portions of the light beam having the shape with a length longer than a width, wherein the width of the first reflected portions of the light beam impinging on the first plurality of photodetectors is less than a width of any one of the first plurality of photodetectors, and the length of the first reflected portions of the light beam impinging on the first plurality of photodetectors is greater than a length of any one of the first plurality of photodetectors and extends across multiple ones of the first plurality of photodetectors in the side-by-side configuration;
a second plurality of photodetectors separate from the first plurality of photodetectors, the second plurality of photodetectors arranged in the side-by-side configuration and configured to receive second portions of the light beam reflected from the surfaces; and
a second lens separate from the first lens, the second lens configured to receive second reflected portions of the light beam and direct the second reflected portions of the light beam onto the second plurality of photodetectors, the second reflected portions of the light beam having the shape with a length longer than a width, wherein the width of the second reflected portions of the light beam impinging on the second plurality of photodetectors is less than a width of any one of the second plurality of photodetectors, and the length of the second reflected portions of the light beam impinging on the second plurality of photodetectors is greater than a length of any one of the second plurality of photodetectors and extends across multiple ones of the second plurality of photodetectors in the side-by-side configuration, wherein the first lens and the second lens are arranged so that a first relative location where the first reflected portions of the light beam impinge on the first plurality of photodetectors is shifted compared to a second relative location where the second reflected portions of the light beam impinge on the second plurality of photodetectors.

13. The system of claim 12 wherein the first plurality of photodetectors are configured to function electrically as a single photodiode.

14. The system of claim 12 wherein the first plurality of photodetectors are configured to function electrically as individual photodiodes or as groups of multiple photodiodes.

15. The system of claim 12 further comprising a mask shaped to limit a field of view of the first plurality of photodetectors depending on a location where the first reflected portions of the light beam impinge on the first plurality of photodetectors in the width direction.

16. The system of claim 12 further comprising a controller configured to increase a gain value applied to amplifiers of outer ones of the first plurality of photodetectors in the side-by-side configuration compared to a gain value applied to amplifiers of inner ones of the first plurality of photodetectors in the side-by-side configuration.

17. A system for detecting the presence of a plant on the ground, comprising:
- a light module configured to emit a light beam having a shape with a length longer than a width, the light beam comprising light at a first wavelength and light at a second wavelength different from the first wavelength;
- a first photodetector configured to receive first portions of the light beam reflected from surfaces that include surfaces on the plant and surfaces on the ground;
- a first lens configured to receive first reflected portions of the light beam and direct the first reflected portions of the light beam onto the first photodetector to provide a first field of view of the surfaces on the first photodetector, the first reflected portions of the light beam having the shape with a length longer than a width;
- a second photodetector configured to receive second portions of the light beam reflected from the surfaces; and
- a second lens configured to receive second reflected portions of the light beam and direct the second reflected portions of the light beam onto the second photodetector to provide a second field of view of the surfaces on the second photodetector, the second reflected portions of the light beam having the shape with a length longer than a width, wherein the first field of view of the surfaces on the first photodetector and the second field of view of the surfaces on the second photodetector both encompass reflected portions from an entirety of the length of the light beam.

18. The system of claim 17 wherein the second lens is arranged to shift a location of the second reflected portions of the light beam impinging on the second photodetector compared to a location of the first reflected portions of the light beam impinging on the first photodetector.

19. The system of claim 17 wherein the first photodetector comprises a first plurality of photodetectors arranged in a side-by-side configuration, and the second photodetector comprises a second plurality of photodetectors arranged in a side-by-side configuration.

20. The system of claim 17 wherein the first photodetector is configured to generate a signal and provide the signal to a controller depending on a sequence of electrical signals generated by the first photodetector.

* * * * *